United States Patent
Cheng et al.

(10) Patent No.: US 9,090,480 B2
(45) Date of Patent: Jul. 28, 2015

(54) PROCESS FOR PREPARING VARIOUS MORPHOLOGY NTE COMPOUND $ZRW_{0.5}MO_{1.5}O_8$

(75) Inventors: Xiaonong Cheng, Jiangsu (CN); Juan Yang, Jiangsu (CN); Qinqin Liu, Jiangsu (CN); Xiujuan Sun, Jiangsu (CN); Guifang Xu, Jiangsu (CN)

(73) Assignee: JIANGSU UNIVERSITY (CN)

( * ) Notice: Subject to any disclaimer, the term of this patent is extended or adjusted under 35 U.S.C. 154(b) by 679 days.

(21) Appl. No.: 13/320,137

(22) PCT Filed: Aug. 27, 2009

(86) PCT No.: PCT/CN2009/000978
§ 371 (c)(1),
(2), (4) Date: Nov. 11, 2011

(87) PCT Pub. No.: WO2011/022859
PCT Pub. Date: Mar. 3, 2011

(65) Prior Publication Data
US 2012/0137960 A1 Jun. 7, 2012

(51) Int. Cl.
*C30B 29/22* (2006.01)
*C01G 41/00* (2006.01)
*B82Y 30/00* (2011.01)

(52) U.S. Cl.
CPC .............. *C01G 41/006* (2013.01); *B82Y 30/00* (2013.01); *C01P 2004/03* (2013.01); *C01P 2004/17* (2013.01)

(58) Field of Classification Search
USPC .............................................. 117/68, 70, 940
See application file for complete search history.

(56) References Cited

FOREIGN PATENT DOCUMENTS

CN         1873063        * 12/2006

OTHER PUBLICATIONS

Liu et al "Hydrothermal Synthesis of negative thermal expansion material Zr W 1.7Mo.3)8 powder" School of Materail Scienece and Engineering Wuji Cailiao Xuebao (2007) 22(1) 70-74.*

* cited by examiner

*Primary Examiner* — Robert M Kunemund
(74) *Attorney, Agent, or Firm* — Schmeiser, Olsen & Watts, LLP

(57) ABSTRACT

A process for preparing various morphology NTE compound $ZrW_{0.5}Mo_{1.5}O_8$ comprising: preparing 0.4M $Zr^{4+}$ solution, 0.2M $W^{6+}$ solution and 0.6M $Mo^{6+}$ solution with zirconyl nitrate, ammonium tungstate and ammo-nium molybdate separately, mixing them with the same volume and stirring until they are mixed well, adding 6-12M hydrochloric acid with the volume of 1/5-1/7 of the mixed solution, or adding 6-12M hydrochloric acid with the volume of 1/3-1/5 of the mixed solution and 0.2-0.4 wt % ammonium monoacid phosphate of all raw materials, or adding 9-18M sulfuric acid with the volume of 1/10-1/5 of the mixed solution, well mixing, transferring the mixed solution into the hydrothermal reactor, reacting at 150-180° C. for 8-25 hours, washing, drying and getting the precursor, heating the precursor at 480-500° C. for more than 5 hours and obtaining the product is provided.

4 Claims, 3 Drawing Sheets

PROCESS FOR PREPARING VARIOUS MORPHOLOGY NTE COMPOUND $ZRW_{0.5}MO_{1.5}O_8$

FIELD OF TECHNOLOGY

The present invention relates to a method for preparing various morphology NTE compound $ZrW_{0.5}Mo_{1.5}O_8$, in particular, to a method for preparing monocrystal, nanobundle and flower-like NTE compound $ZrW_{0.5}Mo_{1.5}O_8$, which belongs to the technology field of inorganic nanomaterials preparation.

BACKGROUND

Typically, most of the materials expand with heat and contract with cold with the change of the outside temperature, but some materials will contract with a rise of temperature, i.e. having negative thermal expansion (referred to as NTE) behavior. However, the NTE materials found in early stage, such as perovskite ferroelectrics $PbTiO_3$, semiconductor material Si, ice, quartz, cordierite, $2MgO.2Al_2O_3.5SiO_2$ and zeolite, have disadvantages of narrow range of negative thermal expansion and anisotropism and there are many difficulties in practical application, so these materials have not attracted widespread attention. Until in 1995, the Sleight research team, University of Oregon, found that $ZrW_2O_8$ has isotropic NTE effects in the temperature range of 0.3~1050K and the thermal expansion coefficient is up to $-8.7 \times 10^{-6} K^{-1}$, and the research institutes all over the world successively carried out the research on NTE materials. Currently the biggest use of NTE materials is combination with positive thermal expansion materials to prepare composite materials with adjustable thermal expansion coefficient, and the NTE materials can be widely used in the electronics, optics, microelectronics, optical communications and daily life fields. But there are two major problems badly in need of solution when using negative thermal expansion materials and positive thermal expansion materials to prepare composite materials: phase transition and random morphology problems of $ZrW_2O_8$. $ZrW_2O_8$ will occur $\alpha$-$\beta$ temperature phase transition at about 430K, the thermal expansion coefficient of which greatly changes from $-8.8 \times 10^{-6} K^{-1}$ to $-4.7 \times 10^{-6} K^{-1}$ and which will lose effectiveness because $ZrW_2O_8$ will produce great thermal mismatch stress with the matrix in the process of actual application; $ZrW_2O_8$ obtained by the traditional solid phase methods has no regular morphology and also has sharp edges and corners, which easily causes local stress concentration, resulting in the generation of microcracks and affecting its practical application. Therefore, it has great significance to prepare isotropic negative thermal expansion materials with regular shape and no phase change in the range of serviceability temperature.

Studies have shown that: W is replaced by Mo to form $ZrW_{2-x}Mo_xO_8$ series NTE solid solution compounds, and the phase transition temperature is decreased with the change of W/Mo ratio, in particular with the increase of the Mo substitution amount, for example, the phase transition temperature of $ZrWMoO_8$ is 270K and the scope of application is expanded below room temperature. Currently, through the systematic research on the structure and nature of the $ZrW_{2-x}Mo_xO_8$ system, looking for a new NTE material is still a main task in the field of negative thermal expansion materials. According to the theoretical speculation, the phase transition temperature of $ZrW_{0.5}Mo_{1.5}O_8$ will be lower, and the application scope also becomes large.

At the present time, there are only a very few reports about controlling the morphology of the NTE materials. Chinese patent ZL200610040201.X used the reflux method to control the morphology of $ZrWMoO_8$ powder, but the reflux method needed long synthesis time and rather complicated procedures and the process was difficult to control; Cora Lind, University of Toledo, in the article "Leah C. Kozy, Muhammad Nawaz Tahir, Cora Lind, Wolfgang Tremel. Particle size and morphology control of negative thermal expansion material cubic zirconium tungstate[J]. J. Mater. Chem., 2009, 19, 2760-2765" reported that using hydro-thermal method, the reaction conditions were strictly controlled to achieve the morphology control of $ZrW_2O_8$, and compared with the reflux method, the hydro-thermal method greatly reduced the experimental period (several hours) because its special reaction conditions were conductive to the formation and growth of the crystal. Cheng Xiaonong, et al., from Jiangsu University in the article "Yang juan, Cheng Xiaonong, Liu Qinqin. A method for preparing negative thermal expansion material $ZrW_{1.7}Mo_{0.3}O_8$ single crystal [p]. ZL200510011252.5" reported using hydro-thermal method to prepare $ZrW_{1.7}Mo_{0.3}O_8$ single crystal, and in the article "Q Q Liu, J Yang, X J Sun, X N Cheng. Morphology control and negative thermal expansion in cubic $ZrWMoO_8$ powders[J]. Physical Status Solidi B-basic Solid State Physics, 2008, 245(11), 2477-2482" and "Q Q Liu, J Yang, X J Sun, X N Cheng. Preparation and characterization of $ZrWMoO_8$ powders with different morphologies using hydrothermal method [J]. Journal of Materials Science, 2007, 42(7), 2528-2531" reported the research on using hydro-thermal method to control the morphology of $ZrWMoO_8$, and because of the specificity of $ZrW_{2-x}Mo_xO_8$, it is found experimentally that the preparation methods of the materials with different W/Mo ratio, especially the process for controlling morphology, are not repetitive, and at present, there is no research report on the morphology control of $ZrW_{0.5}Mo_{1.5}O_8$.

SUMMARY

The objective of the present invention is to provide a method for preparing various morphology NTE compound $ZrW_{0.5}Mo_{1.5}O_8$.

The preparation process is as follows:

(1) preparing 0.4M $Zr^{4+}$ solution, 0.2M $W^{6+}$ solution and 0.6M $Mo^{6+}$ solution with zirconyl nitrate, ammonium wolframate and ammo-nium molybdate separately, mixing them with the same volume and stirring until they are mixed well to obtain the mixed solution 1;

(2) under stirring, adding 6-12M hydrochloric acid with the volume of 1/5-1/7 of the mixed solution 1, or adding 6-12M hydrochloric acid with the volume of 1/3-1/5 of the mixed solution 1 and 0.2-0.4 wt % ammonium monoacid phosphate of all raw materials, or adding 9-18M sulfuric acid with the volume of 1/10-1/5 of the mixed solution 1, and well mixing to obtain the mixed solution 2;

(3) transferring the mixed solution 2 into a hydrothermal reactor and placing into oven, reacting at 150-180° C. for 8-25 hours, repeated washing with deionized water, drying at 50~80□ to obtain the precursors $ZrW_{0.5}Mo_{1.5}O_7(OH)_2 (H_2O)_2$;

(4) the precursors obtained from the above step is heated at 480~500° C. for more than 5 hours to obtain specific morphology NTE compound $ZrW_{0.5}Mo_{1.5}O_8$.

In the step 2, using hydrochloric acid as acid medium can obtain $ZrW_{0.5}Mo_{1.5}O_8$ single crystal bar, using hydrochloric acid with diammonium phosphate as acid medium can obtain nanobundle $ZrW_{0.5}Mo_{1.5}O_8$; and using sulfuric acid as acid medium can obtain flower-like $ZrW_{0.5}Mo_{1.5}O_8$.

In the step 3, the hydrothermal temperature is 160~180° C. and the hydrothermal time is preferably 9-15 h.

The method of the present invention has the following advantages:

(1) the phase transformation temperature of the $ZrW_{0.5}Mo_{1.5}O_8$ powder obtained by the method of the present invention is below room temperature.

(2) the reaction system selected by the present invention can synthesize various morphology $ZrW_{0.5}Mo_{1.5}O_8$ through adjusting the acid medium, additive, reaction temperature and time in the same system.

(3) the method of the present invention adopts hydrothermal method and the product has various morphology with good reproducibility, which lays a good foundation for the research and development of functional materials.

DETAILED DESCRIPTION

Embodiment 1

Figure 1:
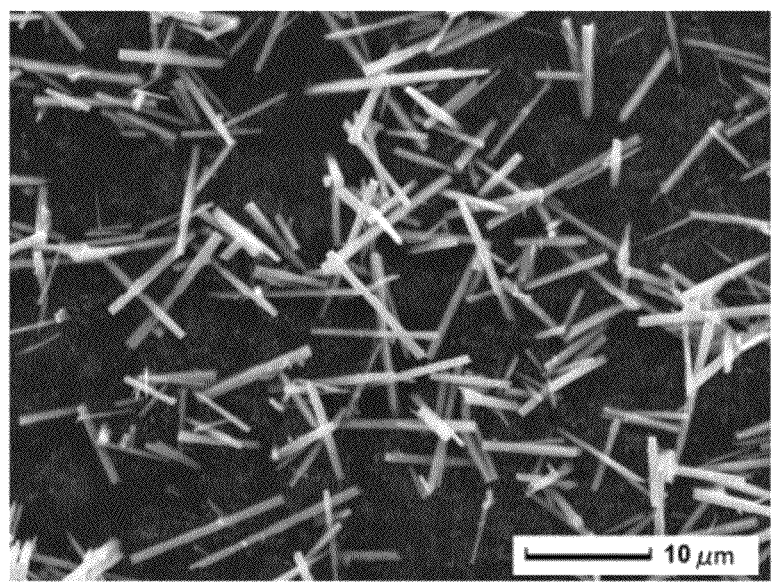
FIG. 1 is scanning electronic microscope (SEM) diagram of the product from the embodiment 1 of the present invention.
Figure 2:
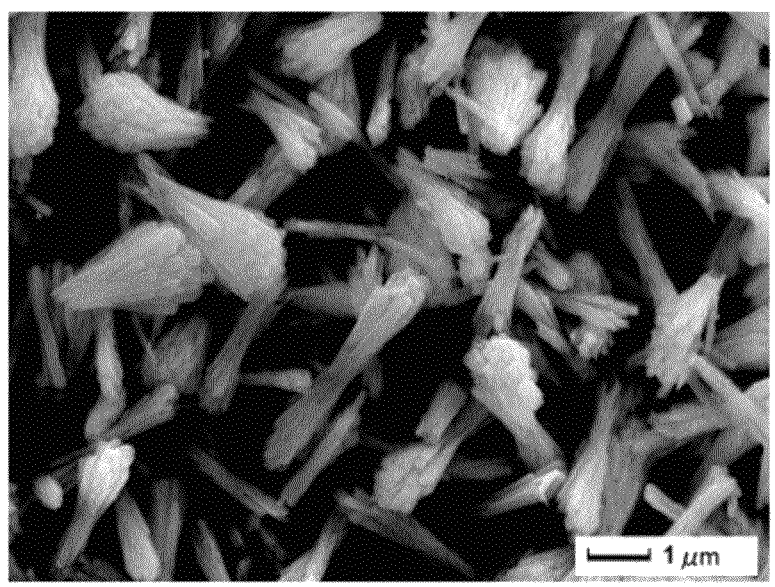
FIG. 2 is scanning electronic microscope (SEM) diagram of the product from the embodiment 4 of the present invention.
Figure 3:
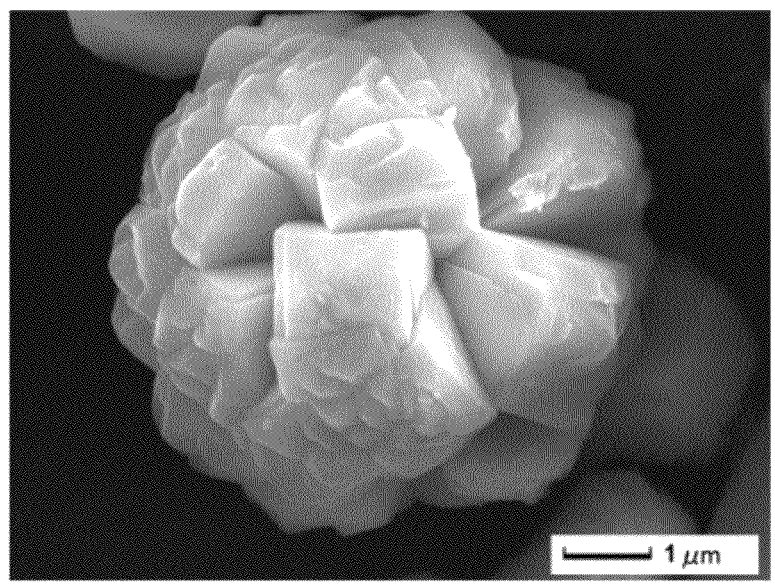
FIG. 3 is scanning electronic microscope (SEM) diagram of the product from the embodiment 6 of the present invention.

Zirconyl nitrate, ammonium tungstate and ammonium molybdate were respectively prepared into 0.4M $Zr^{4+}$ solution, 0.2M $W^{6+}$ solution and 0.6M $Mo^{6+}$ solution, 50 mL of the three solutions were respectively taken and stirred until mixed well. After stirring for 3 hours, 6M hydrochloric acid with the volume of 1/5 of the mixed solution (30 mL) was added into the mixed solution and stirred for 3 h at room temperature. Then the above mixed solution was transferred into a hydrothermal reactor and placed into oven, and reacted for 9 h at 180° C. After the end of reaction, the mixed solution was repeatedly centrifuged and washed with distilled water until the pH value was 7 and there was no white precipitate generated when $AgNO_3$ solution was dropped into the centrifuged supernatant, which proved that $Cl^-$ was completely removed. The mixed solution was dried at 50° C. to obtain the precursor and the precursor was heated at 500° C. for 5 h in an electric resistance furnace to obtain the final product single crystal bar $ZrW_{0.5}Mo_{1.5}O_8$.

Embodiment 2

Zirconyl nitrate, ammonium tungstate and ammonium molybdate were respectively prepared into 0.4M $Zr^{4+}$ solution, 0.2M $W^{6+}$ solution and 0.6M $Mo^{6+}$ solution, 50 mL of the three solutions were respectively taken and stirred until mixed well. After stirring for 3 hours, 9M hydrochloric acid with the volume of 1/6 of the mixed solution (25 mL) was added into the mixed solution and stirred for 3 h at room temperature. Then the above mixed solution was transferred into a hydrothermal reactor and placed into oven, and reacted for 22 h at 155° C. After the end of reaction, the mixed solution was repeatedly centrifuged and washed with distilled water until the pH value was 7 and there was no white precipitate generated when $AgNO_3$ solution was dropped into the centrifuged supernatant, which proved that $Cl^-$ was completely removed. The mixed solution was dried at 50° C. to obtain the precursor and the precursor was heated at 480° C. for 8 h in an electric resistance furnace to obtain the final product single crystal bar $ZrW_{0.5}Mo_{1.5}O_8$.

Embodiment 3

Zirconyl nitrate, ammonium tungstate and ammonium molybdate were respectively prepared into 0.4M $Zr^{4+}$ solution, 0.2M $W^{6+}$ solution and 0.6M $Mo^{6+}$ solution, 50 mL of the three solutions were respectively taken and stirred until mixed well. After stirring for 3 hours, 12M hydrochloric acid with the volume of 1/7 of the mixed solution (21 mL) was added into the mixed solution and stirred for 3 h at room temperature. Then the above mixed solution was transferred into a hydrothermal reactor and placed into oven, and reacted for 14 h at 170° C. After the end of reaction, the mixed solution was repeatedly centrifuged and washed with distilled water until the pH value was 7 and there was no white precipitate generated when $AgNO_3$ solution was dropped into the centrifuged supernatant, which proved that $Cl^-$ was completely removed. The mixed solution was dried at 50° C. to obtain the precursor and the precursor was heated at 500° C. for 5 h in an electric resistance furnace to obtain the final product single crystal bar $ZrW_{0.5}Mo_{1.5}O_8$.

Embodiment 4

Zirconyl nitrate, ammonium tungstate and ammonium molybdate were respectively prepared into 0.4M $Zr^{4+}$ solution, 0.2M $W^{6+}$ solution and 0.6M $Mo^{6+}$ solution, 50 mL of the three solutions were respectively taken and stirred until mixed well. After stirring for 3 hours, 6M hydrochloric acid with the volume of 1/3 of the mixed solution (50 mL) and 0.2 wt % ammonium monoacid phosphate of all raw materials were added into the mixed solution and stirred for 3 h at room temperature. Then the above mixed solution was transferred into a hydrothermal reactor and placed into oven, and reacted for 18 h at 180° C. After the end of reaction, the mixed solution was repeatedly centrifuged and washed with distilled water until the pH value was 7 and there was no white precipitate generated when $AgNO_3$ solution was dropped into the centrifuged supernatant, which proved that $Cl^-$ was completely removed. The mixed solution was dried at 50° C. to obtain the precursor and the precursor was heated at 490° C. for 6 h in an electric resistance furnace to obtain the final product nanobundle-lile $ZrW_{0.5}Mo_{1.5}O_8$.

Embodiment 5

Zirconyl nitrate, ammonium wolframate and ammonium molybdate were respectively prepared into 0.4M $Zr^{4+}$ solution, 0.2M $W^{6+}$ solution and 0.6M $Mo^{6+}$ solution, 50 mL of the three solutions were respectively taken and stirred until mixed well. After stirring for 3 hours, 12M hydrochloric acid with the volume of 1/5 of the mixed solution (30 mL) and 0.4 wt % ammonium monoacid phosphate of all raw materials were added into the mixed solution and stirred for 3 h at room temperature. Then the above mixed solution was transferred into a hydrothermal reactor and placed into oven, and reacted for 18 h at 180° C. After the end of reaction, the mixed solution was repeatedly centrifuged and washed with distilled water until the pH value was 7 and there was no white precipitate generated when $AgNO_3$ solution was dropped into the centrifuged supernatant, which proved that $Cl^-$ was completely removed. The mixed solution was dried at 50° C. to obtain the precursor and the precursor was heated at 490° C. for 6 h in an electric resistance furnace to obtain the final product nanobundle-lile $ZrW_{0.5}Mo_{1.5}O_8$.

Embodiment 6

Zirconyl nitrate, ammonium tungstate and ammonium molybdate were respectively prepared into 0.4M $Zr^{4+}$ solution, 0.2M $W^{6+}$ solution and 0.6M $Mo^{6+}$ solution, 50 mL of the three solutions were respectively taken and stirred until mixed well. After stirring for 3 hours, 9M sulfuric acid with the volume of 1/5 of the mixed solution (30 mL) was added into the mixed solution and stirred for 3 h at room temperature. Then the above mixed solution was transferred into a hydrothermal reactor and placed into oven, and reacted for 15 h at 180° C. After the end of reaction, the mixed solution was repeatedly centrifuged and washed with distilled water until the pH value was 7 and there was no white precipitate generated when $AgNO_3$ solution was dropped into the centrifuged supernatant, which proved that $Cl^-$ was completely removed. The mixed solution was dried at 50° C. to obtain the precursor and the precursor was heated at 500° C. for 8 h in an electric resistance furnace to obtain the final product flower-lile $ZrW_{0.5}Mo_{1.5}O_8$.

Embodiment 7

Zirconyl nitrate, ammonium tungstate and ammonium molybdate were respectively prepared into 0.4M $Zr^{4+}$ solution, 0.2M $W^{6+}$ solution and 0.6M $Mo^{6+}$ solution, 50 mL of the three solutions were respectively taken and stirred until mixed well. After stirring for 3 hours, 18M sulfuric acid with the volume of 1/10 of the mixed solution (15 mL) was added into the mixed solution and stirred for 3 h at room temperature. Then the above mixed solution was transferred into a hydrothermal reactor and placed into oven, and reacted for 15 h at 180° C. After the end of reaction, the mixed solution was repeatedly centrifuged and washed with distilled water until the pH value was 7 and there was no white precipitate generated when $AgNO_3$ solution was dropped into the centrifuged supernatant, which proved that $Cl^-$ was completely removed. The mixed solution was dried at 50° C. to obtain the precursor and the precursor was heated at 500° C. for 8 h in an electric resistance furnace to obtain the final product flower-lile $ZrW_{0.5}Mo_{1.5}O_8$.

The invention claimed is:

1. A method for preparing various morphology NTE compound $ZrW_{0.5}Mo_{1.5}O_8$ comprising the steps of:
    preparing a 0.4M $Zr^{4+}$ solution, a 0.2M $W^{6+}$ solution and a 0.6M $Mo^{6+}$ solution with zirconyl nitrate, ammonium tungstate and ammonium molybdate separately, mixing the 0.4M $Zr^{4+}$ solution, a 0.2M $W^{6+}$ solution and a 0.6M $Mo^{6+}$ solution with a same volume and stirring until at least one of the 0.4M $Zr^{4+}$ solution, the 0.2M $W^{6+}$ solution, and the 0.6M $Mo^{6+}$ solution are mixed well to obtain a first mixed solution;
    after stirring, adding 6M hydrochloric acid with a volume of 1/3 of the first mixed solution and adding a 0.2 wt % ammonium monoacid phosphate of all raw materials into the first mixed solution and well mixing to obtain a second mixed solution;
    transferring the second mixed solution into a hydrothermal reactor and placing into an oven and reacting the second mixed solution for 18 hours at 180° C., followed by repeated washings with deionized water and drying at 50~80° C. to obtain a precursor $ZrW_{0.5}Mo_{1.5}O_7(OH)_2(H_2O)_2$; and
    heating the precursors at 490° C. for 6 hours to obtain a final product nanobundle-lile $ZrW_{0.5}Mo_{1.5}O_8$.

2. A method for preparing various morphology NTE compound $ZrW_{0.5}Mo_{1.5}O_8$ comprising the steps of:
    preparing a 0.4M $Zr^{4+}$ solution, a 0.2M $W^{6+}$ solution and a 0.6M $Mo^{6+}$ solution with zirconyl nitrate, ammonium tungstate and ammonium molybdate separately, mixing the 0.4M $Zr^{4+}$ solution, a 0.2M $W^{6+}$ solution and a 0.6M $Mo^{6+}$ solution with a same volume and stirring until at least one of the 0.4M $Zr^{4+}$ solution, the 0.2M $W^{6+}$ solution, and the 0.6M $Mo^{6+}$ solution are mixed well to obtain a first mixed solution;
    after stirring, adding 12M hydrochloric acid with a volume of 1/5 of the first mixed solution and adding a 0.4 wt % ammonium monoacid phosphate of all raw materials into the first mixed solution and well mixing to obtain a second mixed solution;
    transferring the second mixed solution into a hydrothermal reactor and placing into an oven and reacting the second mixed solution for 18 hours at 180° C., followed by repeated washings with deionized water and drying at 50~80° C. to obtain a precursor $ZrW_{0.5}Mo_{1.5}O_7(OH)_2(H_2O)_2$; and
    heating the precursors at 490° C. for 6 hours to obtain a final product nanobundle-lile $ZrW_{0.5}Mo_{1.5}O_8$.

3. A method for preparing various morphology NTE compound $ZrW_{0.5}Mo_{1.5}O_8$ comprising the steps of:
    preparing a 0.4M $Zr^{4+}$ solution, a 0.2M $W^{6+}$ solution and a 0.6M $Mo^{6+}$ solution with zircon nitrate, ammonium tungstate and ammonium molybdate separately, mixing the 0.4M $Zr^{4+}$ solution, a 0.2M $W^{6+}$ solution and a 0.6M $Mo^{6+}$ solution with a same volume and stirring until at least one of the 0.4M $Zr^{4+}$ solution, the 0.2M $W^{6+}$ solution, and the 0.6M $Mo^{6+}$ solution are mixed well to obtain a first mixed solution;
    after stirring, adding 9M sulfuric acid with a volume of 1/5 of the first mixed solution into the first mixed solution and well mixing to obtain a second mixed solution;
    transferring the second mixed solution into a hydrothermal reactor and placing into an oven and reacting the second mixed solution for 15 hours at 180° C., followed by repeated washings with deionized water and drying at 50~80° C. to obtain a precursor $ZrW_{0.5}Mo_{1.5}O_7(OH)_2(H_2O)_2$; and
    heating the precursors at 500° C. for 8 hours to obtain a final product flower-lile $ZrW_{0.5}Mo_{1.5}O_8$.

4. A method for preparing various morphology NTE compound $ZrW_{0.5}Mo_{1.5}O_8$ comprising the steps of:
    preparing a 0.4M $Zr^{4+}$ solution, a 0.2M $W^{6+}$ solution and a 0.6M $Mo^{6+}$ solution with zirconyl nitrate, ammonium tungstate and ammonium molybdate separately, mixing the 0.4M $Zr^{4+}$ solution, a 0.2M $W^{6+}$ solution and a 0.6M $Mo^{6+}$ solution with a same volume and stirring until at least one of the 0.4M $Zr^{4+}$ solution, the 0.2M $W^{6+}$ solution, and the 0.6M $Mo^{6+}$ solution are mixed well to obtain a first mixed solution;
    after stirring, adding 18M sulfuric acid with a volume of 1/10 of the first mixed solution into the first mixed solution and well mixing to obtain a second mixed solution;
    transferring the second mixed solution into a hydrothermal reactor and placing into an oven and reacting the second mixed solution for 15 hours at 180° C., followed by repeated washings with deionized water and drying at 50~80° C. to obtain a precursor $ZrW_{0.5}Mo_{1.5}O_7(OH)_2(H_2O)_2$; and heating the precursors at 500° C. for 8 hours to obtain a final product flower-lile $ZrW_{0.5}Mo_{1.5}O_8$.

* * * * *